Dec. 25, 1956 R. F. MITCHELL 2,775,158
OPTICAL ANGLE SETTING AND ALIGNING DEVICE
Filed May 9, 1952

WITNESSES.
INVENTOR.
Reginald Fawn Mitchell

United States Patent Office 2,775,158
Patented Dec. 25, 1956

2,775,158

OPTICAL ANGLE SETTING AND ALIGNING DEVICE

Reginald F. Mitchell, Mount Vernon, N. Y.

Application May 9, 1952, Serial No. 286,930

9 Claims. (Cl. 88—2.3)

This application covers an improved type of collimator telescope which facilitates the setting or checking of angles of work surfaces with respect to a reference surface and, if desired, of aligning any reference point with respect to any other point at any desired angle. The great advantage of this device is the speed and convenience with which such delicate operations can be done and the high degree of accuracy possible. Thus the unit can be used to set or check the angle at which any work surface may be to the base of that work piece or the reference surface on which such work piece may be mounted, and such settings may be accomplished without the use of a sine bar and the gage blocks needed to set a sine bar. At the same time, angles can be transferred from a sine bar to a work piece surface if preferred.

Especially important is the fact that this device can be used to set or check faces too small in area or in locations too awkward to permit a sine bar or other means to be used with ease or certainty. For example, small facets of a multi-facet article or a mold for molding such an article provide unique applications for the new unit.

Furthermore, the unit is designed so that additional features and attachments can be added to extend greatly the utility and scope of the instrument. The most important of these permit aligning the device with reference to a point or center line of setting or checking a point or center line on the work surface with reference to such a base point or center; this in addition or in place of setting or checking the angles of the surfaces involved. Another useful extra is the means by which the scale of the main degree calibrated dial can be read through the eyepiece of the instrument in addition to or instead of using a conventional vernier with that scale. Other features will be explained later.

Figure 1:
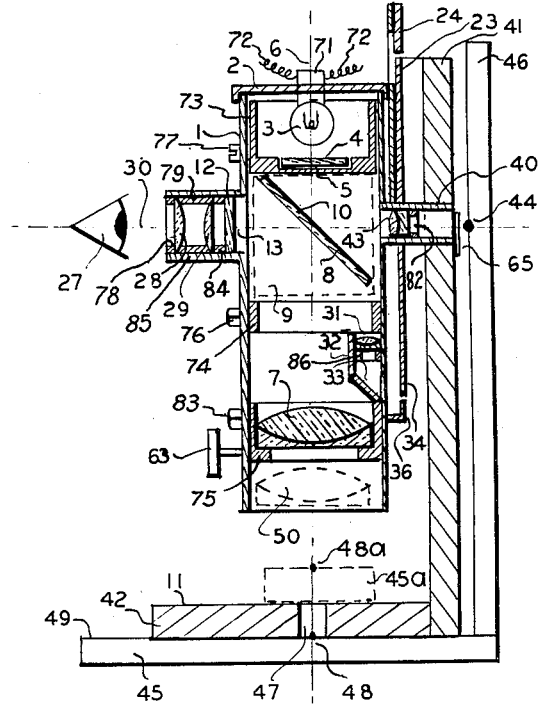
Fig. 1 is a sectional view showing the essential features of the instrument.
Figure 2:
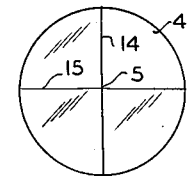
Fig. 2 shows a typical cross line target reticle.
Figure 3:
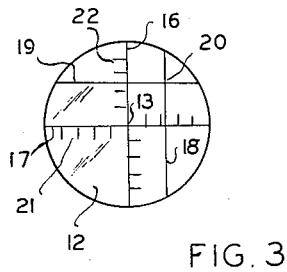
Fig. 3 shows how this target reticle image is seen on the calibrated eyepiece reticle when a slight two azimuth error exists.

In Fig. 1 the main collimator consists of a tube 1 and a removable cap 2 which allows access to a lamp 3 which illuminates a target reticle 4. On this reticle are cross lines 14 and 15 whose intersection 5 is centered on the optical axis 6 of the instrument and which cross lines are set very accurately at the focus of a highly corrected achromat lens 7. Between the target reticle 4 and the lens 7 is an optical beam splitter which can be of any type such as a 45° semi-reflecting mirror 8 or a beam splitting prism 9 where the surface 10 is the effective beam splitting surface. Thus when a surface 11 is set at exactly right angles to the axis 6, rays from the illuminated reticle 4 leave the lens 7 as parallel or collimated rays and are reflected by the surface 11 back along their original paths to the semi-reflecting surface 10 which reflects them at right angles from the axis 6 to a focus on the eyepiece reticle 12 so that the center 5 and the cross lines 14 and 15 coincide respectively with the center 13 and the cross lines 16 and 17 of the eyepiece reticle. Now if the surface 11 is not quite at right angles to the axis 6, then the target lines 14 and 15 might be reflected to image at a position such as at 18 and 19 (Fig. 3) with the center 5 at 20, allowing the coordinates of the angular error of the surface 11 to the axis 6 to be read on the eyepiece reticle calibrations 21 and 22. Obviously this can be done only for minute errors; gross angular settings of the surface 11 require setting the instrument as in Fig. 5 where the angle is read on the dial calibrations 25, with or without a vernier 24 and its calibrations as at 26.

In order to examine the eyepiece reticle satisfactorily it is observed by the eye 27 through a magnifying eyepiece, a typical type of which is indicated by the lenses 28 and 29. The eyepiece and the calibrated eyepiece reticle 12 are centered on the cross optical axis 30 so that the center 5 of the target reticle 4 is centered at 13 when the reflecting surface 11 is normal to the main axis 6. Greater convenience and accuracy can be secured by placing an auxiliary optical system between the main lens 7 and the beam splitter 10. This can be of any convenient type such as a small lens 31 at a position 32 having a small reflector 33 set so it will catch a part of the illumination from the lamp 3 and also focus the illuminated portion 34 of the main dial 23 and the adjacent vernier 36 at 35 and 37 respectively on the eyepiece reticle 12. If preferred, the part 37 of the eyepiece reticle can be a permanent "optical vernier" and the external vernier 36 omitted. In this case the lens 32 would just image the portion 34 of the dial at 35 on the reticle 12 in such a way that the angular position of the instrument with respect to the dial 23, for example as shown in Fig. 5, could be checked instantly and conveniently through the eyepiece without the extra operation of reading the external vernier 24.

Figure 4:
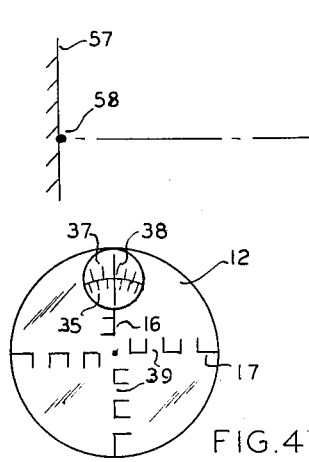
Fig. 4 shows another type of eyepiece reticle calibration and how part of the main dial degree scale can be seen in the eyepiece.

The collimator proper is mounted on a shaft 40 which rotates very precisely centered with respect to the dial 23 which is fixedly attached to the vertical post 41 which in turn is attached to the base 42. Many obvious variations may be used without affecting the basic principles involved. For example, the dial 23 could be made movable with respect to the post 41, or the shaft 40 could be fixed and the collimator proper rotate on it. Again, the vernier 24 could be fixed and the dial 23 rotate with the collimator, but preferably the dial is fixed and the collimator (and vernier 24 if used) rotated with respect to the fixed dial 23. This has the advantage that it permits using a supplementary lens system as at 32 to read the collimator angular setting as covered above. The eyepiece reticle 12 can have any convenient type of graduations as needed such as regular continuous graduations as 21 and 22 in Fig. 3, or broken lines as at 39 in Fig. 4, or an optical vernier could be used as at 37.

In order to align the instrument with a center mark or center line such as at 44, the shaft 40 can be made hollow to contain a lens or lens system 43 arranged so it can focus a center mark as 44 on the eyepiece reticle 12, preferably by arranging the lens 43 so it can be focused for any position the center mark 44 may be. Now if a hole or transparent portion 47 be provided in the base 42 the collimator can be set normal to the base surface 11 or the top surface 49 of the work piece 45 and also aligned so that the axis 6 is centered above the point or center line 48 on the surface 49 and the point thus centered at 13 on the eyepiece reticle 12. In order to focus on such a point or center mark 48 the lens 50 will have to be focussed from its infinity position 7 to a focussed position 50, or some form of internal focussing lens arrangement such as indicated at 51 in Fig. 5 may be preferred.

Figure 5:
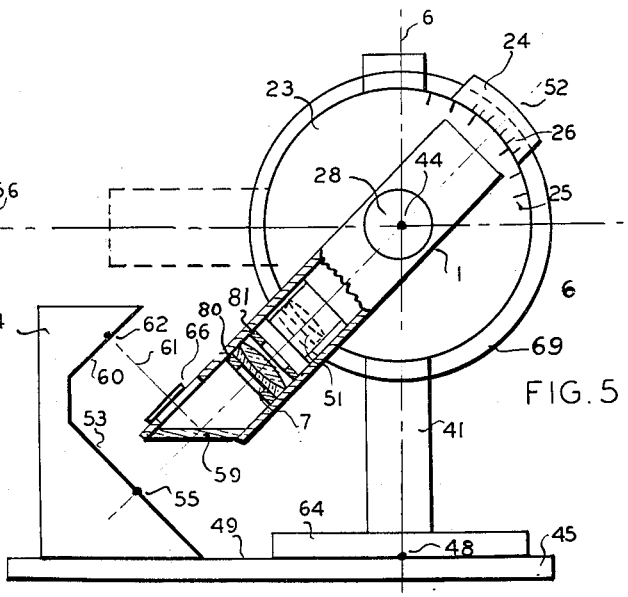
Fig. 5 shows how internal angles can be set or checked with a special mirror attachment and how reference points on several surfaces can be aligned or their alignment checked.

Now if the collimator is rotated to an angle indicated by the axis 52 in Fig. 5, the collimator can be set normal to a surface 53 on another work piece 54. Then by focussing the lens 7 or the internal lens 51, a center point 55 can be determined or the piece 54 moved until the mark 55 is on the axis 52 and therefore in a predetermined angular relation to the points 44 and 48. Furthermore, by again rotating the collimator so that its axis is at a position 56 another surface 57 can be set angularly with respect to the surfaces 49 and 53 and a point 58 aligned (or checked) with respect to the points 44, 48 and 55. Going even further, if a reflector 59 be used on the collimator, an internal angular surface 60 can be checked with respect to the axes 61, 52, 56 and 6. If the reflector 59 is semi-transparent the surfaces 53 and 60 could be checked without removing the mirror 59, a most desirable advantage. It is apparent that the surfaces 53 and 60 could only be checked at one angular setting of the collimator if they were at 90° to each other. By focussing the lens 7 or 51, a point 62 on the surface 60 could be set or checked with respect to the points 58, 48, 44 and 58. Many other variations and modifications will be apparent to those skilled in the art. For example, the shaft 40 could be replaced by a relatively large diameter bearing such as for example one 69 around the periphery of the dial 23. These and similar changes are structural and do not affect the essential principle of the unit. The means for focussing the lens 7 or lens 51 may be a knob 63 or any other preferred arrangement. This is sufficiently obvious that the connecting means for moving such lenses for focussing is omitted for clarity.

Finally, it is evident from the foregoing description that this new device has some of the features of a conventional transit in that the angular relationships of any point can be determined or set with respect to another point. While the base 64 normally does not have a circular scale, it could be so equipped if desired to still further approach the performance of a regular transit. However, it is felt that the combination of the special alignment means described with the feature of collimation to set any surface normal to another is different and sufficiently special in itself that the ordinary features of a transit are not needed but could be added if desired. For the convenience of the user, some form of movable or replace caps such as at 65 and 66 may be wanted to cover up apertures not needed and thus avoid confusion from too many images at any one time. Again these and other conveniences are merely structural features and operational conveniences and do not add or detract from the essential principles involved.

There are many satisfactory ways in which the various elements of the device can be held in the main housing 1 and at the correct optical positions relative to each other. For example, the lamp 3 can have its holder 71 fastened to the housing cover 2 so the lamp leads 72 are readily accessible for connecting to a power supply. The target reticle 4 can be mounted in a cell 73 which is held in the housing 1 by means such as a screw 77. Similarly the beam splitting unit 9 can be held in a cell 74 which is positioned by a screw 76. If the main lens 7 is fixed, it can have its containing cell 75 fastened by a screw 83. If it is to be movable, the cell 75 and the lens 7 can be moved by the pinion knob 63 and the screw 83 used to hold it at any desired position. The eyepiece lens 29 can be spaced from the eyepiece reticle 13 by a spacer tube 84 and from the front eyepiece lens 28 by a spacer tube 79. The combination can be held in the eyepiece housing 85 by a retainer ring such as 78. The lens 43 can be held in the tube shaft 40 by a cell as 82 and a cell 86 can hold the lens 31 in correct position. Another means of hodling the main lens 7 in a fixed position is to set it between two retaining rings 80 and 81 which can be adjusted to position and then tightened. Other equally satisfactory methods can be used but the foregoing are adequate for average purposes.

I claim:

1. An optical angle setting and checking device having a housing containing cells, retaining rings or the like arranged to hold in correct optical relationship a lamp which illuminates a target reticle set at the exact focus of a corrected objective lens to make a collimator where the image of said target is projected from the objective as parallel rays, means such as a rack and pinion for focusing said collimator by moving said objective or by splitting it into a fixed and a movable component so that the device can be used either as a collimator or focusing telescope, a beam splitter between said target reticle and objective so that when the device is set as a collimator and an external reflecting surface is set exactly normal to said parallel rays the image of said target is reflected back into the collimator with said beam splitter reflecting said reflected image to a fous on a calibrated eyepiece reticle and centered thereon, with suitable magnifying means as needed to view said image on said eyepiece reticle, said housing being mounted on a hollow shaft and carrying a vernier so that the combination of housing and vernier can revolve accurately concentric with respect to a circularly calibrated scale which is mounted on a suitable upright attached to a base so the complete device is set at a convenient position above said base, with a lens or lens system set in said hollow shaft arranged so that this lens can focus any mark or line, such as an index line on a reference surface, on to said eyepiece reticle and center said focused index mark on said reticle when said mark is in line with the optical axis of said shaft lens and calibrated eyepiece reticle.

2. An optical angle setting and checking device, as in claim 1, having an additional optical system set between said objective lens and said beam splitter which system consists of a small reflector and small lens arranged so that it directs a part of the light from said lamp on to a portion of said calibrated scale and on a vernier attached to said housing and which is adjacent to said scale, said arrangement of this supplementary lens system focusing said illuminated portion of scale and adjacent vernier on to said eyepiece reticle at a position away from the center of said eyepiece reticle so that any angular setting of said collimator or focusing telescope with respect to said calibrated dial can be read when said reflected image is centered on said eyepiece reticle as described.

3. An optical angle setting and checking device having a housing containing a lamp which illuminates a target reticle set at the exact focus of a corrected objective lens to make a collimator where the image of said target is projected from the objective as parallel rays, means for focusing said collimator by moving said objective in its mounting by means such as a rack and pinion or by splitting it into a fixed and a movable component so that the device can be used either as a collimator or focusing telescope, a beam splitter mounted in a cell or other suitable holder and set between said target reticle and objective so that when the device is set as a collimator and an external reflecting surface is set exactly normal to said parallel rays the image of said target is reflected back into the collimator with said beam splitter reflecting said reflected image to a focus on a calibrated eyepiece reticle mounted in a cell or like means and set in a part of said main housing whose axis is at right angles to the main axis and with the intersection of these two axes at the 45° surface of said beam splitter and centered thereon, with suitable magnifying means as needed to view said image on said eyepiece reticle, said housing being mounted on a hollow shaft substantially centered on said cross axis so that it can revolve accurately concentric with respect to a circularly calibrated dial or scale which is mounted on a suitable upright attached to a base so the complete device is set at a convenient position above said base, with a lens or lens system set in said hollow shaft arranged so this lens can focus any mark or line, such as an index mark on a reference surface, on to said eyepiece reticle and center said focused index mark on said reticle when said mark is in line with the optical axis of said shaft lens and calibrated eyepiece reticle, an extra optical system set between said objective lens and said beam splitter which system consists of a small reflector and small lens arranged so that it directs a portion of the light from said lamp on to a portion of said calibrated scale, said extra lens system focusing the illuminated portion of said scale which may be adjacent to that system at any position of the device with respect to said scale so that said scale portion is focused on said eyepiece reticle and aligned with an optical vernier on said reticle in such a way that the angular setting of the device with respect to said dial can be read accurately when said external reflecting surface is exactly normal to said parallel rays and thus said reflected target image centered on said eyepiece reticle.

4. An optical angle setting and checking device, as in claim 1, having an external semi-reflecting mirror set at 45° so that said external reflecting surface can be set or checked when it is normal to said parallel rays or parallel to them, or both, without moving the device.

5. An optical angle setting and checking device, as in claim 3, having an external semi-reflecting mirror set at 45° so that said external reflecting surface can be set or checked when it is normal to said parallel rays or parallel to them, or both, without moving the device.

6. An optical angle setting and checking device the main housing of which has in it suitable means such as cells, retaining rings and the like for holding in correct optical relationship in that housing a lamp, a target reticle having on it a cross line or like target marking, a beam splitter of any conventional type and an objective lens set at the exact focus of said target reticle, with said beam splitter between said target reticle and objective lens so that its 45° beam splitting surface is set at the intersection of the main housing optical axis and a cross axis at right angles thereto, with a supplementary portion of the main housing being centered on said cross axis and holding therein an eyepiece reticle set at the exact focus of said main objective with respect to a beam reflected by said beam splitter between them, a magnifying eyepiece in said eyepiece portion of the housing to facilitate convenient examination of said eyepiece reticle by the eye, said eyepiece reticle being calibrated as desired to suit the focal length of said objective or otherwise as needed, said main housing having a shaft centered with respect to said cross axis or substantially thereto so that the housing and its contained optics can be rotated with respect to a circularly calibrated dial, vernier means mounted on said housing so as to rotate around the outside of said dial so that the angular position of the housing and its optics can be set or read with respect to said dial, with the dial mounted on any convenient means such as a stand and base for use as needed.

7. An optical angle setting and checking device as in claim 6, having an external semi-reflecting mirror set at 45° so that said external reflecting surface can be set or checked when it is normal to said parallel rays or parallel to them, or both, without moving the device.

8. An optical angle setting and checking device, as in claim 6, except that the main objective be movable by means such as a rack and pinion, so that the main objective can be set to focus at infinity or on a close object as may be needed, in order that it can function both as a collimator or focusing telescope with the associated optics as described.

9. An optical angle setting and checking device the main housing of which has in it suitable means such as cells, retaining rings and the like for holding in correct optical relationship in that housing a lamp arranged to illuminate a target reticle having on it a cross line or like target marking, a beam splitter of any conventional type and a split objective lens consisting of a fixed positive element element or lens and a negative element or lens which negative lens can be mounted in a movable cell which can be operated by means such as a rack and pinion, said split lens combination being such that at one position of said negative lens said target reticle will be an infinity focus so the combination of above described elements will act as a collimator, and with the movable negative lens being movable so the device can function as a conventional internal focusing telescope, said beam splitter being set between said target reticle and main lens so that its 45° beam splitting surface is set at the intersection of the main housing optical axis and a cross axis at right angles thereto, with a supplementary portion of the main housing being centered on said cross axis and holding therein a calibrated eyepiece reticle set at the exact focus of said main lens combination when said negative lens portion is at said infinity position, a magnifying eyepiece in said eyepiece portion of main housing to facilitate convenient examination of said calibrated eyepiece reticle by the eye, said eyepiece reticle being calibrated as desired to suit the focal length of said main lens combination or otherwise as preferred, said main housing having a main shaft centered substantially with respect to said cross axis so that the housing and its optics can be rotated with respect to a circularly calibrated dial and centered thereto, vernier means mounted on said housing so as to rotate around the periphery of said dial so the angular position of said housing and its optics can be set or read with respect to said dial, with the dial mounted on any convenient means such as a stand and base for use as needed.

References Cited in the file of this patent

UNITED STATES PATENTS

| 2,038,914 | Templeton | Apr. 28, 1936 |
| 2,307,951 | Plaut et al. | Jan. 12, 1943 |
| 2,384,507 | Thurlow | Sept. 11, 1945 |
| 2,402,856 | Turrettini | June 25, 1946 |
| 2,420,951 | Williams et al. | May 20, 1947 |
| 2,481,551 | Williams | Sept. 13, 1949 |
| 2,577,807 | Prior | Dec. 11, 1951 |

FOREIGN PATENTS

| 313,882 | Germany | July 21, 1919 |
| 229,287 | Great Britain | Sept. 10, 1925 |
| 240,426 | Great Britain | Nov. 19, 1925 |
| 269,718 | Great Britain | Apr. 28, 1927 |
| 568,936 | Great Britain | Apr. 26, 1945 |